UNITED STATES PATENT OFFICE.

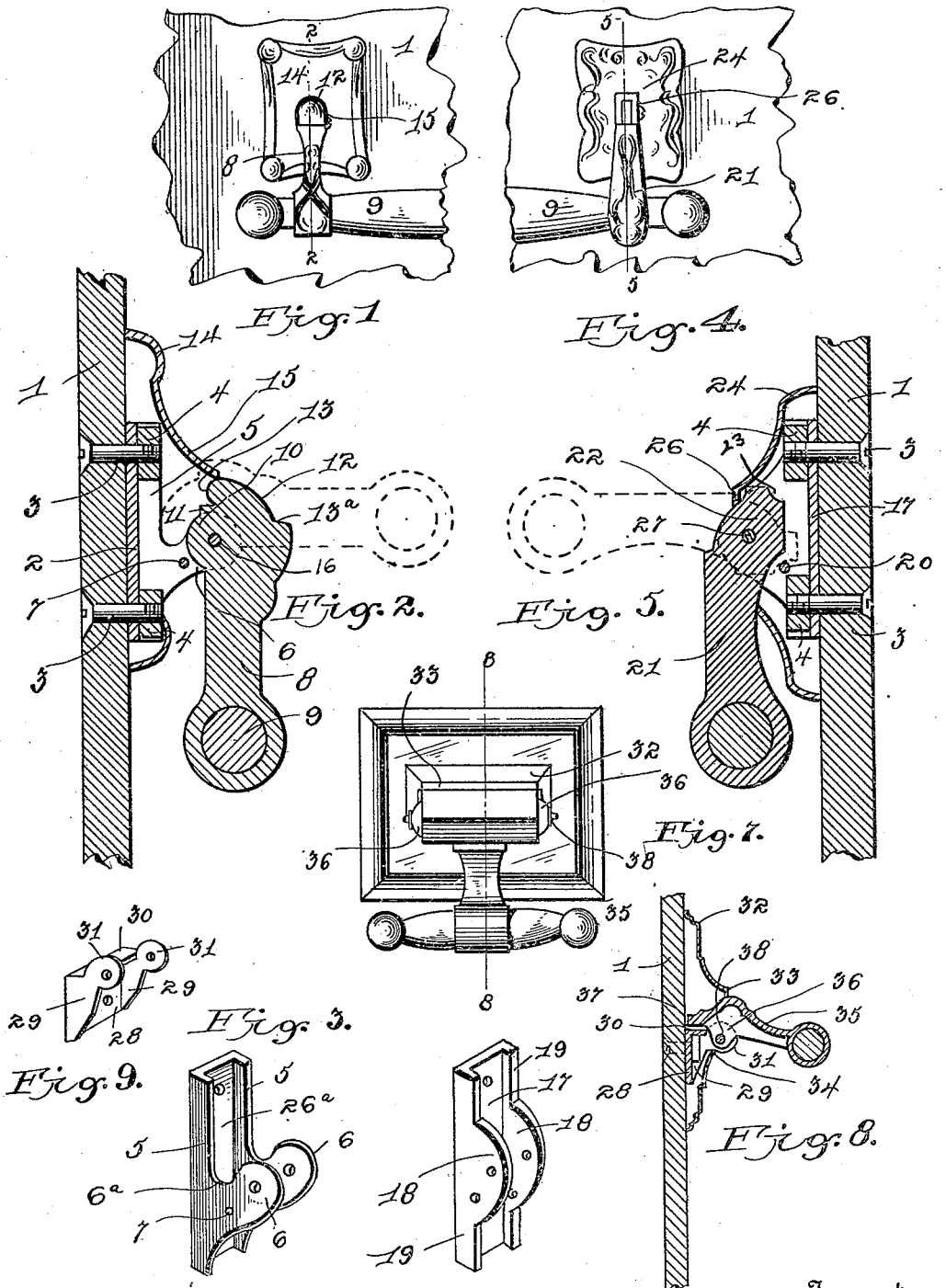

JAMES T. HAMMOND, OF WINSTED, CONNECTICUT.

HANDLE.

958,114.  Specification of Letters Patent.  Patented May 17, 1910.

Application filed September 22, 1909. Serial No. 518,893.

*To all whom it may concern:*

Be it known that I, JAMES T. HAMMOND, a citizen of the United States of America, residing at Winsted, in the county of Litchfield and State of Connecticut, have invented certain new and useful Improvements in Handles, of which the following is a specification, reference being had therein to the accompanying drawing.

This invention relates to handles for caskets and the like, and the principal object of the same is to provide a handle which may be readily detached from a casket.

As is well known in this art, it is customary to provide the caskets with plates to which the handles are pivotally attached. These plates being on the exterior of the caskets are ornamented and either of precious metal or heavily plated to imitate precious metal, and the screws or other fasteners which attach the plates to the caskets are heavily plated to correspond to the said plates. Obviously this greatly increases the expense of caskets.

The present invention is primarily intended to provide means whereby the said plates and fasteners may be of cheap material, and not plated, the plates to be provided with means for detachable and pivotal engagement with the handles, said plates and their pivotal connection with the handles being covered and concealed by a cap plate which is held in its plate concealing position by the pivot pin which holds the plates and handle in pivot engagement.

In carrying out the object of the invention generally stated above, it will, of course, be readily understood that the essential features of the invention involved are necessarily susceptible of changes in details and structural arrangements, certain preferred and practical embodiments of which are shown in the accompanying drawings, wherein—

Figure 1 is a fragmentary view in front elevation of one form of the invention. Fig. 2 is a central vertical sectional view taken on the line 2—2, Fig. 1. Fig. 3 is a detail perspective view of the pivot plate used in connection with the form of the invention shown in Figs. 1 and 2. Fig. 4 is a view similar to Fig. 1 showing a variation of the invention. Fig. 5 is a central vertical sectional view taken on the line 5—5, Fig. 4. Fig. 6 is a detail perspective view of the pivot plate used in connection with the form of the invention shown in Fig. 4. Fig. 7 is a view similar to Figs. 1 and 4, showing a further variation of the invention. Fig. 8 is a vertical sectional view taken on the line 8—8, Fig. 7. Fig. 9 is a detail perspective view of the pivot plate used in connection with the form of the invention shown in Figs. 7 and 8.

Referring to said drawings by numerals, and more particularly to Figs. 1, 2 and 3 thereof, 1 designates the casket or other receptacle to the outer side of which the pivot plate 2 is detachably held by means of the bolts 3 and nuts 4. Said plate is elongated and vertically arranged on the casket and has its longitudinal edges outturned to provide the side flanges 5 between which the nuts 4 are seated. At a point below their centers, each flange 5 is provided with an outwardly - projecting, upwardly - inclined pivot ear 6. A pin 7 connects said ears adjacent their inner portion. Each ear 6 has its upper edge recessed adjacent its junction with the flanges 5, as indicated at 6$^a$. The pivot plate 2 and its fastening bolts and nuts 3—4 may be of a low grade of metal. The handle arms 8 are of high grade metal, or cheap metal plated, and are ornamented as is usual. The outer ends of said arms are connected by the usual handgrip 9. The inner end portion of said arm 8 has a narrow pivot ear 10 formed on its under surface and slightly in advance of said ear, an abutment shoulder 11 is formed on said end portion. The upper surface of said end portion is wide and rounded as indicated at 12, and overhangs said pivot ear 10 and shoulder 11, and terminates in a lip 13. The upper portion of said portion 12 is provided with a shoulder 13$^a$. An ornamental cap 14 is adapted to be placed over said pivot plate 2, said cap fitting snugly against the casket 1 and having a centrally located outstanding contracted portion 15 which fits close about the pivot ears 6 of said plate 1. The outer end of said outstanding portion is open.

In applying the improved handle to a casket, the plate 2 is fastened thereon, the cap plate 14 placed over the plate 2 and the pivot ear 10 of the handle arm passed through the open portion of said cap plate and between the ears 6 of the plate 2. A pivot pin 16 is then passed through the contracted portion of the cap plate, the ears 6 of plate 2, and the ear 10 of the handle arm, thereby holding the cap plate in contact with the casket and over the pivot plate 2, and the handle in pivotal engagement with the pivot plate 2. When the handle is in lifting position, the same will be projected at right angles to the casket with the shoulder 13ᵃ of arm 8 in contact with the upper edge of the opening in the end of the contracted portion 15 of the cap plate 14, the overhanging portion of the end of the arm in contact with the recessed portion of the pivot ears 6 and the lip 13 in engagement with the pin 7 of the plate 2, thereby permitting the casket to be raised by said handle.

In Figs. 4 and 5, the pivot plate 17 has pivot ears 18 centrally located on the side flanges 19. A pin 20 connects said ears. The handle arm 21 has a flattened inner ear 22 which terminates in a reduced recessed portion 23. The cap 24 has an open-ended contracted portion 26, which fits close to the ears 18 when said cap surrounds the plate 17. The cap, pivot ears 18 and ear 22 of the handle arm 21 are connected by the pivot pin 27. When the handle is in the casket-lifting position indicated by dotted lines in Fig. 5, the recessed portion of the arm 21 will be in contact with the pin 20 which limits the outward movement of said arm to a position at right angles to the casket.

In Figs. 7, 8 and 9, the pivot plate 28 has side flanges 29 and a top flange 30. Pivot ears 31 project outwardly and upwardly from the corners formed by the juncture of the top flange with the side flanges. The cap plate 32 has an outwardly-projecting, open-ended portion 33 in the bottom edge of which pivot ears 34 corresponding to the pivot ears 31 are formed. The handle arm 35 has its inner end enlarged and provided with pivot ears 36 and a forwardly-projecting flap lip 37. When assembling this form of the invention, the cap plate 32 is fitted over the pivot plate 28 and the inner end of the handle arm is passed through the opening of said cap plate with its pivot ears 36 in alinement with the ears of said cap plate and pivot plate, after which a pivot pin 38 is passed through said alined ears. As will be obvious, the handle is limited in its outward swinging movements by contact of the lip 37 with the top flange 30 of the pivot plate 28.

From the foregoing, it will be seen that in all forms of the invention the cap plate and handle are held in engagement with the casket by the pin which pivotally connects the handle to the said pivot plate, and also that the pivot plate serves to limit the outward swing of the handle so that the limit of the outward swing of said handle is in a position substantially at right angles to the casket.

Another prominent feature of the invention is in the shape of the pivot plate employed. It will be readily seen that the side flanges of the said plate provide a channel in which the lock nuts are seated and prevented from turning by said flanges.

What I claim as my invention is:—

1. In a device of the character described, the combination with a receptacle, of a pivot plate for the side thereof, said plate being provided with oppositely disposed pivot ears, a cap plate fitted over said pivot plate and provided with a front opening, a handle arm having one end provided with a pivot ear, and a pivot pin passing through the said cap plate, pivot ears of the pivot plate and the pivot ear of the handle arm.

2. In a device of the character described, the combination with a receptacle, of a plate carried thereby, a cap plate adapted to be fitted over said plate to conceal the same, a handle arm, a pin for holding the cap plate in rigid engagement with said plate and the handle arm in pivotal engagement therewith, and means carried by the said plate for limiting the pivotal movement of said handle arm in one direction.

3. In a device of the character described, the combination with a receptacle, of a pivot plate having a channeled body, fastening bolts passing through said receptacle and said pivot plate, nuts for said bolts adapted to be seated in the channeled body of said plate, a cap plate for said pivot plate, and a handle also connected to said pivot plate.

4. In a device of the character described, the combination with a receptacle, of a pivot plate provided with side flanges, means for fastening said plate to said receptacle, a cap plate fitted over said pivot plate, a handle arm projecting through said cap plate, a pivot pin for connecting said cap plate and handle arm to said pivot plate, and means carried by said flanges for limiting the movement of said arm in one direction.

5. In a device of the character described, the combination with a receptacle, of a plate fastened thereto, a cap plate surrounding said plate, a handle arm projecting through said cap plate, means for connecting said handle arm and cap plate to said first-mentioned plate, and means carried by said first-mentioned plate for limiting the movement of said handle arm in one direction.

In testimony whereof I hereunto affix my signature in presence of two witnesses.

JAMES T. HAMMOND.

Witnesses:
JAMES HART,
HARRIE E. STARKS.